(12) United States Patent
Ciaramitaro

(10) Patent No.: US 6,872,266 B1
(45) Date of Patent: Mar. 29, 2005

(54) TRIAZOLE CROSSLINKED POLYMERS IN RECYCLABLE ENERGETIC COMPOSITIONS AND METHOD OF PREPARING THE SAME

(75) Inventor: David Ciaramitaro, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 22 days.

(21) Appl. No.: 10/699,479

(22) Filed: Oct. 30, 2003

Related U.S. Application Data

(62) Division of application No. 10/449,626, filed on May 30, 2003.

(51) Int. Cl.[7] ............................................... D03D 23/00
(52) U.S. Cl. .................................................... 149/109.6
(58) Field of Search ........................... 149/109.6, 19.91

(56) References Cited

U.S. PATENT DOCUMENTS

| 4,293,352 A | | 10/1981 | Lee et al. | |
|---|---|---|---|---|
| 5,681,904 A | * | 10/1997 | Manzara | ...................... 525/404 |
| 6,103,029 A | | 8/2000 | Reed, Jr. | |

* cited by examiner

*Primary Examiner*—Aileen Felton
(74) *Attorney, Agent, or Firm*—Charlene A. Haley

(57) ABSTRACT

A recyclable energetic composition and method of processing energetic compositions cured by cyclo-addition of azido groups of the polymer binder with di- and/or tri-acetylene curatives (components) to form triazole linkages, such that the cure reaction is accelerated or delayed at will without degradation, allowing storage and later recycling of unused material for reduction of hazardous waste, and reduction of pollution.

8 Claims, No Drawings

TRIAZOLE CROSSLINKED POLYMERS IN RECYCLABLE ENERGETIC COMPOSITIONS AND METHOD OF PREPARING THE SAME

CROSS-REFERENCE TO RELATED APPLICATIONS

This is a divisional application, claiming the benefit of, parent application Ser. No. 10/449,626 filed on May 30, 2003, whereby the entire disclosure of which is incorporated hereby reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The present invention relates to recyclable energetic compositions and methods of processing the same, and more specifically, energetic compositions that facilitate reduction of process pollution, reuse of what would otherwise be hazardous waste, and reduction of the expense that is involved in its disposal.

BACKGROUND OF THE INVENTION

Approximately 100 million pounds of energetic material waste, or 41 percent of the total life-cycle energetic waste production, is generated during munitions manufacture. An additional 449,000 tons of energetic waste is produced during demilitarization of these munitions. State-of-the-art propellant and explosive formulations are typically cast-cured composite materials mixed in batches ranging from a few gallons to hundreds of gallons. The ullage and overage material produced as a result of these processes forms a large proportion of the resultant waste.

Polyurethane linkages are widely used to polymerize the binders in both propellants and plastic bonded explosives (PBX) via the reaction of long-chain, high-molecular-weight, oligomeric polyalcohols with polyisocyanates. Isocyanates begin to react with any available hydroxyl groups in or on the binder oligomers upon mixing. These hydroxyl groups can include those available from trace amounts of moisture in the binder or the ingredients. The reaction rate is increased, preferentially with the organic hydroxy groups, by the addition of catalysts, promoters or heat, but it runs at a finite rate regardless of the concentrations of these additives or the ambient temperature. These mix parameters are adjusted and balanced against each other in the processing facility to optimize two essentially contradictory aspects of the mixture: a maximum pot life, in order to have plenty of time to mix and cast the formula into the item needed; and, a minimum cure temperature and time, which allows a rapid turnover of finished items with a minimum of thermal damage potential to what may be sensitive and/or reactive ingredients.

However, once the curative is mixed in, there is no practical way to stop the reaction. Consequently, if excess material has been made, and it can not be used that day and the mixture must be disposed of, as it will either be too viscous to remix with fresh formulation, or the cure reaction will have progressed or degraded by homopolymerization and reactions with moisture to the point where its use or addition to fresh formulation would only degrade the processability and ultimate properties of the freshly-made propellant or explosive.

As a consequence of this inexorable cure reaction, leftover material and material clinging to the sides of the mix pot or the casting hardware after casting must typically be cleaned up and disposed of. The cleanup process generally involves a laborious scraping down and wiping of the surfaces by hand, the use of solvents that may be flammable or toxic or both, and the transfer of the excess mixture, together with the wipes and contaminated solvent, to proper containers for disposal. The costs of the disposal of this hazardous energetic material are increasing steadily, not only in costs for permits and fees charged by authorized disposal sites, but also in the lost value of the ingredients and binders thus disposed of. The environmental burden of the disposal is also increased by the loss of the ingredients, since environmentally unfriendly processes must frequently be resorted to in order to replenish stocks of these energetic ingredients.

The reclaim and reuse of such waste or "scrap" energetic material is thus seen as a desirable goal. Some binders have been specially synthesized so that they can be hydrolyzed by dilute acids or bases and the solid ingredients recovered by recrystallization or filtration as illustrated in U.S. Pat. No. 4,293,352. The method that perhaps has achieved the greatest application in actual production is the use of thermoplastic elastomeric materials as binders. In principle, these formulations can be recovered by melting or dissolving the TPE binder away from the solid ingredients, reconstituting the binder with added TPE, and reformulating. However, this recovery process is only practical with a narrow range of binder materials, and the processing must be done with an extruder, which means that processing is very much less facile and adaptable than by using the cast-cure processes described earlier.

From the foregoing, it will be appreciated that there is a need in the art for a cast-cure process with a cure reaction, that, for all practical purposes, can be stopped and started at will. Such a process will allow leftover quantities of formulation mixtures to be stored and recycled into new mixtures of the same formulations. This recyclability will result in a great reduction of the amount of hazardous waste generated by a mixing facility, with a concomitant reduction in the expense, hazards, pollution, and environmental burdens associated with this waste.

SUMMARY OF THE INVENTION

Embodiments of the present invention include storable, recyclable energetic compositions resulting from methods of making energetic compositions whose binders are formed by chemically reacting azido groups of the polymer binder by cyclo-addition of the acetylenic components of the curative to form triazole linkages without the need for the polyacetylene curatives to be dispersed into the formulation with the aid of a solvent and/or by heating.

The present invention to provides a high energy, stable, energetic composition formed by chemically reacting the azido group of a binder with di- and tri-acetylenes to form triazole linkages without the aid of a volatile solvent and the concomitant necessity of removal of this solvent by heating when the polyacetylenes are added. The present invention also provides a high energy, stable, non-degrading energetic composition that is allowed to accumulate and then reclaimed and reused into later production of the same formulation which maintains a good correlation in burn rate characteristics and mechanical properties. The present invention further includes a process for the manufacture of high energy, stable, non-degrading energetic compositions that is less inexpensive and environmentally safer, so as to leave virtually no leftover material to be scrapped, thereby reducing clean-up and hazardous waste disposal of the energetic composition.

It is to be understood that the foregoing general description and the following detailed description are exemplary and explanatory only and are not to be viewed as being restrictive of the present invention, as claimed. These and other objects, features and advantages of the present invention will become apparent after a review of the following detailed description of the disclosed embodiments and the appended claims.

DESCRIPTION OF THE PREFERRED EMBODIMENTS

The present invention includes an energetic composition and method of processing the same for low temperature storage, recyclability, reduction of the quantity of hazardous waste, and reduction of pollution caused by the manufacture thereof. Embodiments of the present invention include recyclable energetic compositions and methods of making energetic compositions that are formed by chemically reacting azido groups of the polymer binder by cyclo-addition of polyacetylene compounds to form triazole linkages without the need of a solvent which necessitates later removal by heating.

The present invention incorporates by reference U.S. Pat. No. 6,103,029, which describes a binder cure based on the reaction of azido groups with acetylenes to form triazole linkages. Unlike the reaction of isocyanates with hydroxyls to form urethane linkages, the triazole reaction needs no catalysts. The reaction rate of the present invention is determined by the extent to which the acetylene bond is activated by any electron-withdrawing groups in its vicinity in the molecule, and by the ambient temperature. The activating groups are, but are not limited to, nitrites, carbonyls, ethylenes, and aryl moieties.

In the present invention, the temperature at which the reaction between the acetylene curatives (or components) and azido-groups proceed is a much more critical parameter than that of the catalyzed reaction of hydroxyl and isocyanate to form urethanes. When the acetylene moiety is not activated, the temperature of the triazole reaction is very high and the mixture of acetylenic and azido compounds will sit at lower temperatures indefinitely without reacting. With activated acetylenes (those containing electron-withdrawing moieties in their structures) in the present invention, the temperature at which the reaction proceeds is much lower, into the range of about 100–140° F., which is practical for energetic material cure reactions, but below this temperature, the mixture of acetylenics and azido-compounds will sit for at least a week without reaction.

The embodiments of the present invention allow the advantages of thermoplastic, extrudable composites, (i.e., being virtually scrapless and recyclable) to accrue to the binders of cast-cured composite materials more commonly used in energetic materials production. By utilizing this cure reaction, the binder and curative is mixed together at a temperature lower than that necessary to cure the mixture (i.e., ambient or room temperature). Preferably, when mixing is complete, the items to be cast are poured into the appropriate containers. The excess material remaining in the pot and the other vessels is transferred to a container to be stored at ambient temperature (about 77° F.) while the cast item is moved to the cure oven. The stored material is mixed the next day into the next batch of formulation, and the same operations are preferably performed. The present invention will now be explained with references to the following non-limiting examples.

EXAMPLES 1–6

The order of addition of components described hereto can be altered; generally, the goal is to maximize the fluidity of the mixture throughout the addition of the solid components to promote a homogeneous mixture. For example, curatives are added at any time during the mix, although it is preferable to wait until after the mixture has cooled down to room temperature. One skilled in the art would recognize that larger mixtures of the energetic composition would require longer mixing times, to ensure that homogeneity and wetting are maximized on the larger amounts of solid materials.

For the recycling experiments of the present invention, the first batch consisted of three identical energetic compositions TZ-1, TZ-2, TZ-3 made in three-pint size mixes. TZ-1 was mixed, cast and cured as a control. Leftover material from TZ-2 was saved overnight and cast onto leftover material from TZ-3 and the resultant material cured. The second batch consisted of: a first mix TZ-4, which half was cured in an oven and the other half was stored for two days at room temperature; a second mix TZ-5, which half was cured in an oven and the half was mixed into the stored portion of mix TZ-4 to produce a third mix TZ-4/5. All six mixes were formulated by combining the components and their weight percentages shown in Table 1, using the following process:

1. Weighing and adding the binder(s)-bis(azido-methyl) oxetane/azidomethyl-methyl-oxetane (BAMO/AMMO) (or also referred to as BN-7), plasticizer(s)-butanetriol trinitrate (BTTN), and stabilizer(s)-N-methyl,p-nitroaniline or N-methyl nitroanilne (MNA) components together. The components are mixed until homogeneous. The temperature is raised, if necessary, to 100–145° F. to facilitate dissolution of the binder and stabilizer into the plasticizer.

A. In another preferred embodiment for batches larger than a pint, the stabilizer(s) component (MNA) is dissolved in a solvent (acetone), followed by combining the stabilizer/solvent (MNA/acetone) mixture with the plasticizer (BTTN) first before combing with the binder and oxidizer. The solvent is rotary evaporated. (The stabilizer keeps the decomposition of the BTTN under storage conditions to a minimum). The binder/plasticizer stabilizer mixture is then cooled to room temperature.

TABLE 1

Triazole Cure Formulation for Recycle Experiments.

| Components | Weight percent |
| --- | --- |
| BAMO/NMMO (BN-7) | 10.0 |
| Dipropargyl isophthalate | 0.532 |
| Trimesic tripropargylate | 0.111 |
| BTTN | 29.857 |
| ADN, Crystalline | 39.0 |
| MNA | 0.5 |
| UFA1, ALEX | 10.0 |
| Spherical Aluminum, H-30 | 10.0 |

2. Mixing the binder/plasticizer/stabilizer mixture at room temperature with the other formulation ingredients (i.e., oxidizers, energetic materials, fuels, opacifiers, burn rate catalysts, etc.) for the time periods necessary in order to homogeneously incorporate them into the mix.

Room temperature is defined as an indoor temperature of from about 50 to 100° F.

3. Weighing and adding the diacetylene component (dipropargyl isophthalate) to the completed mixture at room temperature to extend the polymeric chains of the binder(s). The diacetylene component is added to the mixture without the aid of a solvent.

4. Weighing and adding the component(s) of aluminum.

5. Weighing and adding the crosslinking polyacetylene component (trimesic tripropargylate) to the mixture at room temperature. The triacetylene component is added to the mixture without the aid of a solvent.

(The di- and tri-acetylene curatives (components) used in these triazole-cured mixes replace the functions of the di and polyisocyanates in urethane cure mixes. In urethane cure mixes, diisocyanates would be added so that the urethane reaction can extend the polymeric chains before the crosslinking begins. The mixing pot would be kept hot during the urethane mix, so the chain-extension reaction would have a head start on the crosslinking reaction, ensuring longer chains. Acetylene components do not react this way at room temperature. Chain-extending diacetylenes in the present invention are added to the mixture before the crosslinking triacetylenes so that the diacetylenes have a head start on dissolving in the binder/plasticizer to order the reaction, to the degree possible, to produce longer chains before crosslinking occurs. The method of these embodiments of the present invention enables the formation of an intimate, homogeneous mixture.)

The mixture is preferably cast into a mold, under vacuum and with vibration, to ensure that any remaining entrained air is removed from the mixture. The mold is put into an oven (preferably about 120° F., depending on compounds utilized) for a week and cured into an elastomeric compound. Any leftover composition is stored in a container overnight at room temperature and added to another mix of a freshly prepared batch of the same composition the next day.

In addition to the components of the present inventions' energetic compositions, other oxidizers, fuels, burn rate catalysts and modifiers, thermal and aging stabilizers, opacifiers, and other such ingredients commonly utilized in solid propellant formulations and other energetic compositions are used. To test whether leftover mixes stored at room temperature would maintain a good correlation in burn rate characteristics as freshly made batches, strand burn rates of each of the six batches were tested. The strand burn rates for the first three mixes of the energetic compositions are shown in Table 2.

TABLE 2

Calculated Strand Burn Rates of Triazole Formulations

| Pressure, psi | TZ-1 Calc'd Burn Rate, in/sec $r_b$ | TZ-2/3 Calc'd Burn Rate, in/sec $r_b$ |
|---|---|---|
| 500 | 0.71 | 0.63 |
| 1000 | 1.33 | 1.08 |
| 1500 | 1.48 | 1.47 |
| 2000 | 1.64 | 1.84 |
| 2500 | 2.09 | 2.19 |
| 3000 | 2.35 | 2.52 |
| 3500 | 2.61 | 2.83 |
| Pressure Exponent, n | 0.63 | 0.77 |

In the first set of examples 1–3, the first mix TZ-1 was cast into a slab and the strands were cut form this and burned. The second two mixes TZ-2 and TZ-3 were used to make 2"×2" motors. The leftover material from the first of these mixes (TZ-2) was cast at room temperature into the bottom of a slab mold and stored, uncured, overnight. The next day, the third mix (TZ-3) of the same energetic composition were made and two more motors were cast. The remainder of this mix was then added to that of the previous day, and the slab put into the oven to cure. No mixing was done in this case. Strands of the dual-mix slab were burned and compared with those of the single mix.

The calculated values of the straight lines described by the burns are shown in FIG. 1. Correlation is fairly good and the data showed very little scatter. The burn rates are found to be within the experimental error. Strand burn rate data include the descriptor rb which represents the burn rate in inches/second at a given p (pressure) and n, which represents the pressure exponent or the derivative of the slope of the burn rate curve as the burning rate increases with pressure.

These examples demonstrate that leftover (stored) energetic compositions of the present invention will cure on demand despite the passage of time, with no degradation in the homogeneity of the resultant combination of mixes, as the correlation in burn characteristics of the control and experimental combination shows.

The second set of recycling examples 4–6 include three energetic compositions (TZ-4, TZ-5, TZ-4/5) and are also based on the components listed in Table 1. TZ-4 was made by the process above and then split in half. Half was poured under vacuum into a slab mold and put in the curing oven; the other half was stored for two days at room temperature. TZ-5 was also made by the process above where half the mix was removed into a slab for curing, and then the stored TZ-5 mix was added to the remainder in the mix pot and the batches stirred together. This mixture, TZ-4/5 was then cast and cured like the rest. Mechanical properties and burn rates were taken at 500–5000 psi on the three mixes for comparison, as shown in Table 3.

TABLE 3

Burn Rates of Triazole Recycle Experiment Mixtures.

| Calculated Strand Burn Rate | TZ-4 | TZ-5 | TZ-4/5 |
|---|---|---|---|
| Burn Rate @ 500 psi, in/sec | 0.65 | 0.64 | 0.63 |
| Burn Rate @ 1000 psi, in/sec | 1.05 | 1.04 | 1.07 |
| Burn Rate @ 1500 psi, in/sec | 1.39 | 1.40 | 1.46 |
| Burn Rate @ 2000 psi, in/sec | 1.70 | 1.56 | 1.81 |
| Burn Rate @ 2500 psi, in/sec | 1.99 | 1.72 | 2.15 |
| Burn Rate @ 3000 psi, in/sec | 2.26 | 2.02 | 2.47 |
| Burn Rate @ 3500 psi, in/sec | 2.51 | 2.57 | 2.79 |
| Burn Rate @ 4000 psi, in/sec | 2.76 | 2.83 | 3.09 |
| Burn Rate @ 4500 psi, in/sec | 3.00 | 3.08 | 3.38 |
| Burn Rate @ 5000 psi, in/sec | 4.25 | 3.32 | 3.66 |
| Burn Rate Exponent "n" from 500–5000 psi | 0.70 | 0.72 | 0.77 |

These mixtures (TZ-4, TZ-5, TZ-4/5) exhibit burn rates in agreement with the first set of recycling examples, especially as strand burns and slopes for small experimental mixes with laboratory batches of ingredients seem to vary a fair amount. Mechanical properties were determined on *Joint Army, Navy, NASA, and Air Force* [*Interagency Propulsion Committee*] (JANNAF) truncated endbonded mini-dogbones at 77° F. Results of the pull rates are shown in Table 4.

TABLE 4

Mechanical Properties of Recycle Experiment Mixes

| Mix | Pull Rate | $E_0$, Psi | $S_m$, Psi (Corr./Uncorr) | $e_b$, % | $e_m$, % |
|---|---|---|---|---|---|
| TZ-4 | 2"/min | 510 | 58/63 | 9 | 9 |
|  | 20"/min | 712 | 57/62 | 9 | 9 |
|  | 200"/min | 1005 | 67/74 | 10 | 10 |
| TZ-5 | 2"/min | 728 | 44/47 | 7 | 7 |
|  | 20"/min | 473 | 50/55 | 11 | 11 |
|  | 200"/min | 1160 | 64/67 | 5 | 5 |
| TZ-4/5 | 2"/min | 533 | 44/48 | 8 | 8 |
|  | 20"/min | 458 | 23/24 | 6 | 6 |
|  | 200"/min | 848 | 61/65 | 8 | 8 |

"$E_0$" is Young's Modulus which represents part of the stress (pull effort)-strain (length stretched) curve that the energetic composition material can be pulled and released, back and forth, infinitely without changing. "$S_m$" represents the maximum stress, which is the greatest amount of force measured that it took to stretch the energetic composition material to a desired length. "$e_m$" represents the percent strain at maximum stress. "$e_b$" represents the strain at breakage. In a good composite rubber or elastomeric compound, the strain at break is long (as many hundred percents of original length as possible) and the stress at this point will be very close to the maximum. Naturally, this ideal set of conditions is only approached with materials that have been highly developed over years, notably polybutadiene rubbers.

The agreement for all the samples is within experimental error, except possibly for the TZ-28/9 Stress reading at 20"/min. This is believed to have been caused by an internal flaw or void in the sample. The strand burn rate experiments of Tables 2 and 3 demonstrate that one can, by using this process with the triazole cured binder materials, recycle the excess production of several days' mixes of the energetic compositions of the present invention and cure them together without a degradation in consistency of properties. It was also shown that the triazole cure, with the acetylene curatives proceeds very slowly until the temperature is raised to the about 120° F. range. It was also found that samples stored at room temperature eventually cured after two weeks' time.

One embodiment of the present invention includes recyclable energetic compositions for low temperature storage prepared by the process comprising a mixture of at least one binder compound having at least one pendant azido group component and at least one plasticizer component, (the binder/plasticizer and/or stabilizer mixture is heated, if necessary, to dissolve and homogenize the components while being mixed), and thereafter the binder/plasticizer/stabilizer mixture is cooled to room temperature. Heating is necessary when it is desired to reduce the time required for the solution of the binder and stabilizer into the plasticizer. Cooling afterwards is necessary to slow the reaction of the acetylene. Heating, when is utilized in the mixture, is for viscosity reduction during mixing and casting, depending on the reactivity of the acetylenic curatives, but in any case, any portions destined for recycle must be allowed to cool afterwards, to enable the storage of the unused material. Low temperature storage is also referred to as ambient or room temperature that is about 50° to 100° F. Low temperature storage is necessary in order to be able to retard curing in order to mix the still liquid material into the next day's production. In another embodiment, other solid propellant ingredients are added to the binder/plasticizer components including the oxidizer while being heated.

At least one chain-extending diacetylene component, at least one crosslinking triacetylene component, at least one oxidizer component, and at least one metal, metallic, or non-metallic fuel component, or any combination thereof, are added into the mixture when the mixture reaches or is near room temperature. However, in another embodiment, where the viscosity of the mixture must be minimized during mixing and casting, the acetylene curatives are added to the mixture while being heated (about 115–155° F.). The diacetylene component(s) is combined for a sufficient amount of time (about 5–60 minutes, or depending on the type and amount of components utilized) with the mixture before the triacetylene component(s) is combined with the mixture to produce longer oligomer chains on the binder(s); the triacetylene component(s), metal, metallic, or non-metallic fuel component(s), and the oxidizer component(s) are combined to produce a homogeneous composition wherein the composition is cured into an elastomeric material by chemically reacting the azido groups of the polymer binder(s) by cyclo-addition of the polyacetylene component(s) to form triazole linkages.

The diacetylene component includes dipropargyl isophthalate and/or dipropargyl terephthalate. However, the diacetylene component is further selected from the group comprising at least one of 1, 4 di-(cyanoethynyl) benzene and its isomers, 2,11 dodecanedione-1,12-dipropiolate, α,Ω-polyethylene glycol dipropiolate, and aliphatic or aromatic organic compounds with two separated activated acetylenic moieties.

One triacetylene component includes trimesic tripropargylate, however, the triacetylene components are further selected from the group comprising trihydroxy compounds functionalized by esterification with propiolic acid, tricarboxylic acid functionalized with propargyl alcohol, and polycarboxylic acid or polyol functionalized to have more than three acetylene groups. It is believed that these compounds will work to mimic the effect of polyisocyanates like N-100 or PAPI (polyaromatic polyisocyanate). Any aliphatic or aromatic organic compound with three or more separated activated acetylenic moieties will suffice.

It is important to note that the diacetylene and triacetylene components are combined into the mixture without the aid of a solvent and/or without reheating the mixture. Solubilities of these compounds in the binder/plasticizer mixtures appear to be very low, but dispersion and reaction with the binder proceeds without the aid of a solvent.

Another embodiment of the present invention includes an energetic composition prepared by a process which further includes at least one stabilizer dissolved in a volatile solvent. In this embodiment, the stabilizer/solvent is first combined with the plasticizer and/or binder/plasticizer mixture before combined with the binder and the oxidizer to prevent any decomposition of the plasticizer, and thereafter, the solvent is removed by evaporation under vacuum. However, any other method known in the art can be utilized to remove the solvent including sparging with air or an inert gas. Preferably, in the mixture comprising at least one binder, plasticizer, stabilizer and oxidizer component(s) are combined at temperatures of at least approximately 100° F. This method of stabilizer incorporation saves time, but the solvent must be completely evaporated from the plasticizer mixture before the latter is incorporated into the mix.

It was observed that the temperature at which the reaction proceeds between the acetylenic compounds and the azido groups to form triazoles is a much more critical parameter than that of the catalyst reaction of hydroxyl and isocyanate which forms urethanes and other products. Preferably, the diacetylene component is combined for a sufficient amount of time with the mixture to maximize diffusion and to begin reaction to produce longer polymer chains on the binder before the polyacetylene component is combined with the mixture for crosslinking. Finally, a rubbery or elastomeric composite material is formed by chemically reacting the azido groups of the polymer binder by cyclo-addition of the polyacetylene component(s) to form triazole linkages.

Another embodiment of the present invention includes a method of making a recyclable energetic composition for low temperature of about 50° to 100° F. (preferably about 77° F. or below) storage comprising: mixing at least one binder compound having at least one pendant azido group component with at least one plasticizer component to ensure homogeneity; heating the binder(s) and plasticizer(s) mixture while stirring to ensure homogeneity (optionally under vacuum or other similar methods known in the art); cooling the mixture to room temperature; adding at least one diacetylene component (diacetylene components include, but are not limited to, dipropargyl isophthalate, dipropargyl terephthalate, 1,4-di-(cyanoethynyl) benzene and its isomers, 2,11 dodecanedione-1,12-dipropiolate, □,Ω-polyethylene glycol dipropiolate, aliphatic or aromatic organic compounds with two separated activated acetylenic moieties, and other suitably activated diacetylene compounds) to the mixture without the aid of a solvent to produce longer oligomeric chains on the binder(s); adding at least one metal, metallic, nonmetallic fuel, oxidizer, energetic ingredient, (and stabilizer) to the mixture at room temperature; and adding at least one tri- or higher polyacetylene component without the aid of a solvent to produce a homogeneous composition which is cured or crosslinked as needed by heating in order to chemically react the azido groups of the polymer binder(s) by cyclo-addition of the triacetylene component to form triazole linkages. In another embodiment, other solid propellant ingredients are added to the binder/plasticizer components including the oxidizer while being heated.

Another embodiment of the present invention includes a method of making the recyclable energetic composition which further comprises adding at least one stabilizer component to the mixture. To save time, the stabilizer component(s) is preferably dissolved in a volatile solvent. Preferably, the stabilizer component(s) is combined into the plasticizer component(s) first and the solvent quantitatively evaporated before combining with the binder(s) and the oxidizer(s) to prevent any decomposition of the plasticizer (s). In one embodiment, the diacetylene and triacetylene component(s) are combined to the mixture while being heated. Preferably, heating of the binder(s), plasticizer(s), stabilizer(s), and oxidizer(s) mixture ranges from temperatures of about 100° F. to about 130° F. Additionally, in some embodiments of the present invention, the stabilizer includes N-methyl, p-nitroaniline or N-methyl nitroanilne (MNA).

The preferred binder(s) of the present invention is selected from the group comprising polyglycidyl azide (GAP), azidomethyl-methyl-oxetane (AMMO), bis (azidomethyl)oxetane/nitratomethyl-methyloxetane (BAMO/NMMO), bis(azidomethyl)oxetane/azidomethyl-methyl-oxetane (BAMO/AMMO), copolymers, derivatives, and any combinations thereof. Binders are further selected from the group comprising conventional hydroxyl-terminated polyalkanes, polyalkenes, polyethers, polyesters, copolymers, derivatives, and any combinations thereof which have had the terminal hydroxyl moieties replaced with an azido-function. Other embodiments comprise energetic binders including poly-nitratomethyl-methyl oxetane (poly-NMMO) and polyglycidyl nitrate (PGN) which have azido moieties added to the ends. Some embodiments of polymeric oligomer are to be crosslinked comprise of azidomethyl oxetanes copolymerized and distributed along a chain of nitratomethyl oxetanes. The azido groups on the polymer react with the polyacetylene molecule to effect the cure. These embodiments are binders including poly BAMO/NMMO and BAMO/AMMO. In the examples described earlier, a commercial copolymer BN-7 was utilized which is comprised of a polymeric chain including approximately 70% by weight bis-azidomethyl oxetane (BAMO) and 30% by weight nitromethylmethyl oxetane (NMMO) units. This copolymer is typically called poly BAMO/NMMO or BAMO/NMMO. Approximately 5–25 weight percent of energetic composition is at least one azido-binder component.

The replacement of hydroxyl or the otherwise termination of the oligomeric ends with azido can be done by several chemical synthetic methods. However, the activated acetylenes of the present invention are also attached to the ends of the oligomers by esterification or otherwise modifying the hydroxyl group, and the resulting acetylene-end-capped oligomers are then used as curatives or crosslinkers with polyazido compounds, including GAP, AMMO or BAMO monomer or oligomer.

The plasticizer component of the present invention is selected from the group comprising butanetriol trinitrate (BTTN), trimethyl-olethanetrinitrate (TMETN), triethyl-eneglycoldinitrate (TEGDN), diethylene-glycoldinitrate (DEGDN), nitroglycerine (NG), bis(2,2-dinitropropyl) acetal/bis(2,2-dinitropropyl)formal (BDNPF/BDNPA), nitratoethylnitramine (alkyl NENA's), bis-(2,2-dinitropropyl)acetal/formal (BDNPF/A), and any combination thereof. Other plasticizer components of the present invention are further selected from the group comprising polycyano-2-(difluoramino)-2,3-epoxyethane (PCDE), bis (2,2-dinitro-2-fluoroethoxy)methane (FEFO), bis[2,2-bis (difluoramino)-5,5-dinitro-5-fluoropentoxy]methane (SYFO), 1,3-bis(fluorodinitroethoxy)-2,2-bis(difluoramino) propane (SYEP), 1,2,3-tris[1,2-bis(difluoramino)ethoxy] propane (TVOPA), acetyl triethyl citrate, dibutyl phthalate (DBP), dibutyl sebacate (DBS), dioctyl adipate (DOA), dioctyl azelate (DOZ), isodecyl pelargonate (IDP), triacetin, tributyrin, and any combination thereof. Many of these plasticizer components are modifiable by esterifying with a different alcohol, i.e., diethyl phthalate and so forth. Generally, what is sought here is an ester or other organic compound of low volatility (so it won't evaporate during mixing, curing or aging) that is soluble or miscible with the binder material, and makes the resultant composite tougher, less brittle at low temperatures. In some embodiments, the plasticizer component includes BTTN. Approximately 20–35 weight percent of energetic composition is at least one plasticizer component.

The oxidizer component(s) of the present invention includes dinitramide salt oxidizers which further include ammonium dinitramide (ADN) and/or potassium dinitramide. In other embodiments the oxidizer component includes ammonium dinitramide (ADN). The oxidizer component is further selected from the group comprising hexa-nitro-hexa-aza-isowurtzitane (HNIW, a.k.a CL-20), polynitropolyacetylhexaazaisowurtzitanes including; dinitrotetraacetylhexa-azaisowurtzitane, trinitrotriacetylhexaazaisowurtzitane, tetranitrodiacetyl-hexaazaisowurtane and pentanitromonoacetylhexaazaisowurtzitane, cyclotrimethylenetrinitramine (RDX), cyclotetramethylene tetranitramine (HMX), 4,10-dinitro-2,6,8,12-tetraoxa-4,10-diazatetracyclo-[(5.5.0.0.sup.5,90.sup.3,11]-dodecane (TEX), 3-nitro-1,2,4-triazol-5-one (NTO), nitroguanidine (NQ), 1,3,5-triamino-2,4,6-trinitrobenzene (TATB), 1,3,3-trinitroazetidine (TNAZ), 1,1-diamino-2,2-dinitro ethane (DADNE), ammonium perchlorate (AP), ammonium nitrate (AN), hydroxylammonium nitrate (HAN), and any combination thereof. Approximately 20–88 weight percent of energetic composition is at least one oxidizer component.

The metal, metallic, non-metallic fuel component(s) of the present invention is selected from the group comprising aluminum, particulate aluminum, ultra fine aluminum, titanium, carbon black, graphite, boron, magnesium, zirconium, beryllium, lithium, bismuth, zirconium, their hydrides and carbides, and any combination thereof.

The term "metal" refers to alkali metals, alkaline earth metals, rare earth metals, transition metals, as well as to the metalloids or semimetals. The term "metallic" refers to any substance incorporating a metal, including alloys, mixtures and compounds. The present invention also utilizes a metallic particulate component as the fuel. This metallic particulate component comprises metal fuels having aluminum, magnesium, zirconium, beryllium, boron, lithium, and bismuth. Alternatively, mixtures of particles of different kinds of metals are used with the present invention. In addition, mixtures and/or alloys comprising these materials are also contemplated for use in the present invention. Other possibilities include alloys of two or more metals, or one or more metals in combination with one or more additional substances, e.g., other metal or nonmetal components, aluminum borohydride or lithium borohydride.

In most embodiments of the present invention, the metal fuel includes, but not limited to aluminum. These metal fuels are further selected from the group comprising aluminum, particulate aluminum $Al^1$, $Al^2$, $Al^3$, ultra fine (nano) aluminum, and spherical aluminum. Also included in metal fuels are H-3, H-30, H-60, and H-90 from Valimet, the manufacturer, which their average particle size varies from about 3–90 microns. Other particle sizes of aluminum are additionally in the energetic compositions including, but not limited to, H-3 and H-60, etc.

The particulate of >1$\mu$ in some embodiments includes approximately 0–20 weight percent of energetic composition. Additionally, when ultra fine aluminum (<1$\mu$) is utilized it is approximately 0–20 weight percent of energetic composition. Aluminum is the most commonly used metal in solid rocket propellants, and is often selected because it is relatively inexpensive, non-toxic, has a high-energy content, and exhibits good burning characteristics. The nature of the mixture of oxidizer and fuel in the present invention also permits for compositions using fuels that are of lower atomic weight than aluminum to achieve a burn process and burn rate within a preferred range for propellants.

The activated acetylene components in the present invention are any activated di and polyacetylenes which are utilized as curatives or crosslinkers. The diacetylene utilized in the present invention includes dipropargyl terephthalate and/or dipropargyl isophthalate and the triacetylene component includes trimesic tripropargylate. Approximately 0.1–10 weight percent of energetic composition are acetylene/(di- and/or tri-polyacetylenes).

The energetic compositions and methods of the present inventions further comprise adding other components to the energetic composition which are selected from the group comprising burn rate catalysts and modifiers, thermal, combustion and aging stabilizers, and opacifiers. Table 5 includes, but is not limited to, the weight percents of the components utilized in embodiments of the present invention energetic compositions.

TABLE 5

Components utilized in the present invention energetic compositions

| Energetic Components | Weight percentages |
|---|---|
| BAMO/NMMO (BN-7) | 5–25% |
| Dipropargyl terephthalate or trimesic tripropargylate | 0.2–4% |
| Butanetriol Trinitrate | 20–35% |
| Ammonium Dinitramide | 25–65% |
| Particulate Aluminum > 1$\mu$ | 0–20% |
| Ultrafine Aluminum < 1$\mu$ | 20–0% |
| N-Methyl-Nitroaniline | 0.5–1% |

The energetic compositions and methods of preparing the present invention are formulated and processed to reduce pollution, waste, expense and enable safer handling of these propellant and explosive materials. The term "energetic compositions" includes, but not limited to propellants, explosives, gas generators, and pyrotechnic compositions. The energetic compositions of the present invention reduce atmospheric pollution as the ADN and the ultra fine aluminum assist the efficient combustion of the spherical aluminum in the absence of halogen in the combustion atmosphere. The energetic compositions are environmentally friendly since the "scrap" leftover composition, if stored at room temperature, is reclaimable and reusable. This attribute reduces the quantity of leftover mix to be scrapped, which means that lesser quantities of potentially toxic or otherwise harmful solvents for cleaning are utilized. The energetic compositions of the present invention are formulated and prepared to accumulate over long periods of time and remain uncured until sufficient combined material is available to rework into later production (when the same formulation were in production).

This type of binder-crosslinker reaction and will thus reduce the scrap material to be disposed of to a few cloth or paper wipes and only a small proportion of the former quantity of solvent, saving the formerly wasted excess energetic composition for later production. Reuse of the energetic compositions reduces the environmental burden hitherto imposed by not only the destruction of the scrap material but that involved with the manufacture of the ingredients necessary to replace the material. The energetic compositions and methods of the present invention will reduce the costs and environmental burdens inherent in state-of-the-art cast-cured systems without the necessity of the extruder and the special processing that thermoplastic elastomeric binders (TPEs) demand. Previously, extruded thermoplastic elastomeric compositions were among the few energetic compositions that enabled storage and recycling of excess or reworked material, and cast-cured compositions did not allow this.

It should be understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A method of making an energetic composition for low temperature storage comprising:
    mixing at least one binder compound having at least one pendant azido group component with at least one plasticizer component;

heating said binder(s) and said plasticizer(s) mixture until the mixture is homogeneous;

cooling said mixture to room temperature;

adding at least one diacetylene component to said mixture without the aid of a solvent to produce longer polymer chains on said binder(s);

adding at least one metal, metallic, non-metal fuel, oxidizer component(s) to said mixture at room temperature; and adding at least one tri- or higher polyacetylene component without the aid of a solvent to produce a homogeneous solid, elastomeric composition which is formed by chemically reacting said azido groups of said polymer binder(s) by cyclo-addition of said triacetylene component(s) to form triazole linkages, wherein said energetic composition is recyclable.

2. The method according to claim 1, further comprising adding at least one stabilizer component to said mixture and while heating said mixture.

3. The method according to claim 1, further comprising at least one stabilizer component dissolved in a volatile solvent, combining said stabilizer to said plasticizer first before combining with said binder to prevent any decomposition of said plasticizer.

4. The method according to claim 1, wherein said diacetylene and said tri- or higher polyacetylene component are combined to the mixture while being heated.

5. The method according to claim 1, wherein said heating of said binder(s) and said plasticizer(s) mixture ranges from temperatures of about 100° F. to about 130° F.

6. The method according to claim 1, further comprising adding other components to said energetic composition selected from the group comprising burn rate catalysts and modifiers, thermal, combustion and aging stabilizers, and opacifiers.

7. The method according to claim 1, wherein other solid propellant ingredients are added to the binder/plasticizer components including said oxidizer.

8. The energetic low temperature storage composition obtained by the process defined in claim 1.

* * * * *